United States Patent [19]
Kirschner

[11] Patent Number: 5,218,474
[45] Date of Patent: Jun. 8, 1993

[54] VIDEO DISPLAY TERMINAL VISOR

[76] Inventor: Kevin A. Kirschner, 1010 Rancho Rd., Corona, Calif. 91720

[21] Appl. No.: 763,312

[22] Filed: Sep. 20, 1991

[51] Int. Cl.$^5$ .............................................. G02B 27/00
[52] U.S. Cl. ..................... 359/601; 359/609; 358/252
[58] Field of Search .............. 359/601, 609, 610, 613, 359/614; 358/252, 255

[56] References Cited

U.S. PATENT DOCUMENTS

| | | | |
|---|---|---|---|
| 4,444,465 | 4/1984 | Giulie et al. | 359/601 |
| 4,569,572 | 2/1986 | Kopich | 359/601 |
| 4,784,468 | 11/1988 | Tierney | 359/601 |
| 5,069,529 | 12/1991 | Takahashi | 359/601 |
| 5,115,345 | 5/1992 | Hobson et al. | 359/601 |
| 5,121,253 | 6/1992 | Waintroob | 359/601 |

*Primary Examiner*—Loha Ben
*Attorney, Agent, or Firm*—William L. Chapin

[57] ABSTRACT

An article for shielding the display screen of a video display terminal (VDT) from unwanted light and unauthorized viewing comprises a visor attachable around the periphery of a CRT face plate or around the face plate of other types of video display devices. The VDT visor includes thin, flat sheets of a stiff material such as chipboard laminated on upper and lower flat sides thereof by flexible vinyl cover sheets to form panel members. In the preferred embodiment, three separate, generally rectangular chipboard sheets are laminated between a single upper vinyl cover sheet and a single lower vinyl cover sheet, the outer peripheral edges of the cover sheets being bonded together to encapsulate the chipboard sheets in an adjacent relationship to one another. The vinyl material overlying spaces between adjacent chipboard sheets forms self-hinges permitting the panel members to be unfolded from a flat storage position into an inverted U-shaped channel structure comformable around the sides and top of a VDT, and attachable thereto by means of hook and loop fasteners attached to the lower vinyl cover sheet and to the VDT enclosure.

19 Claims, 3 Drawing Sheets

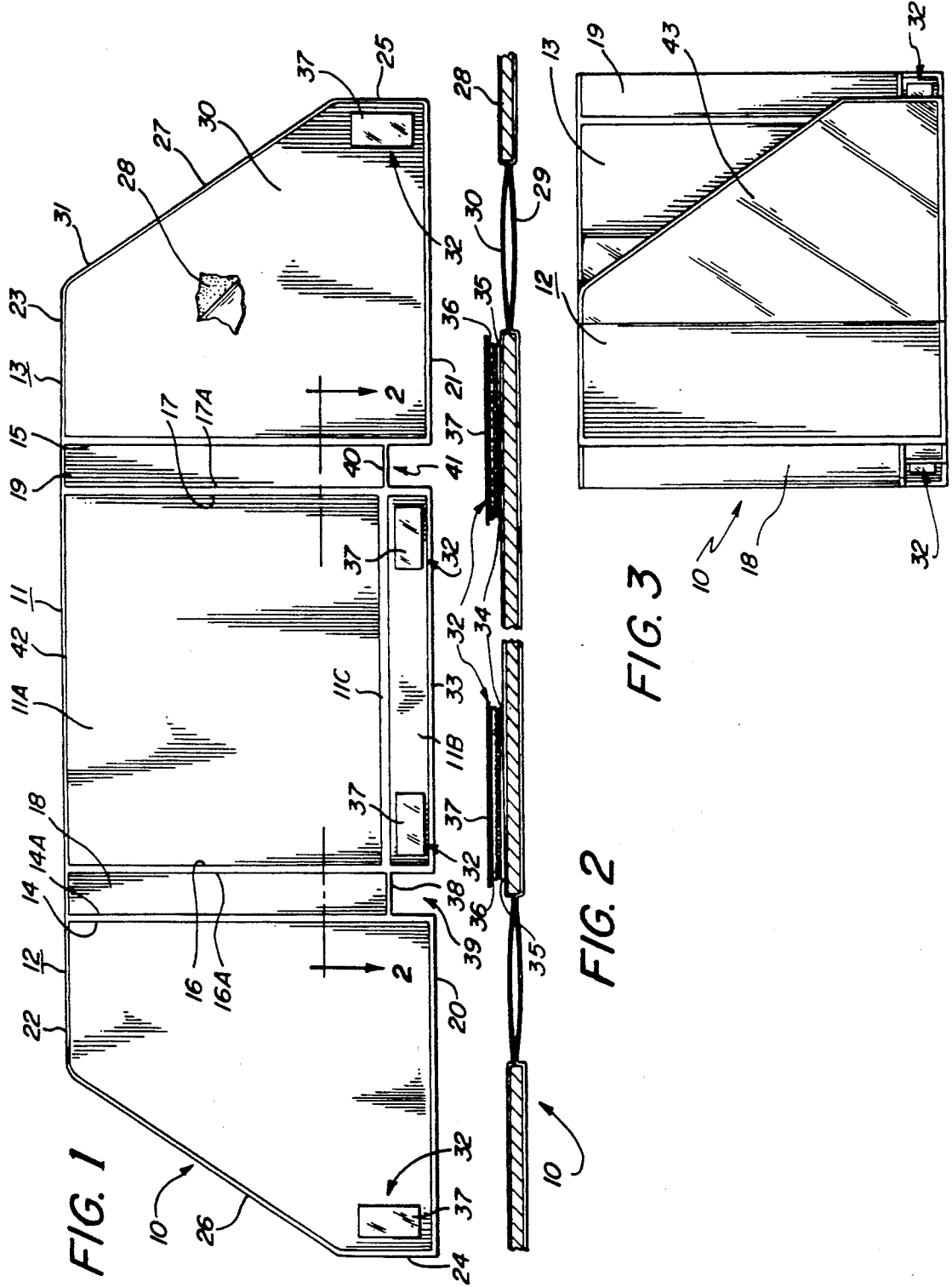

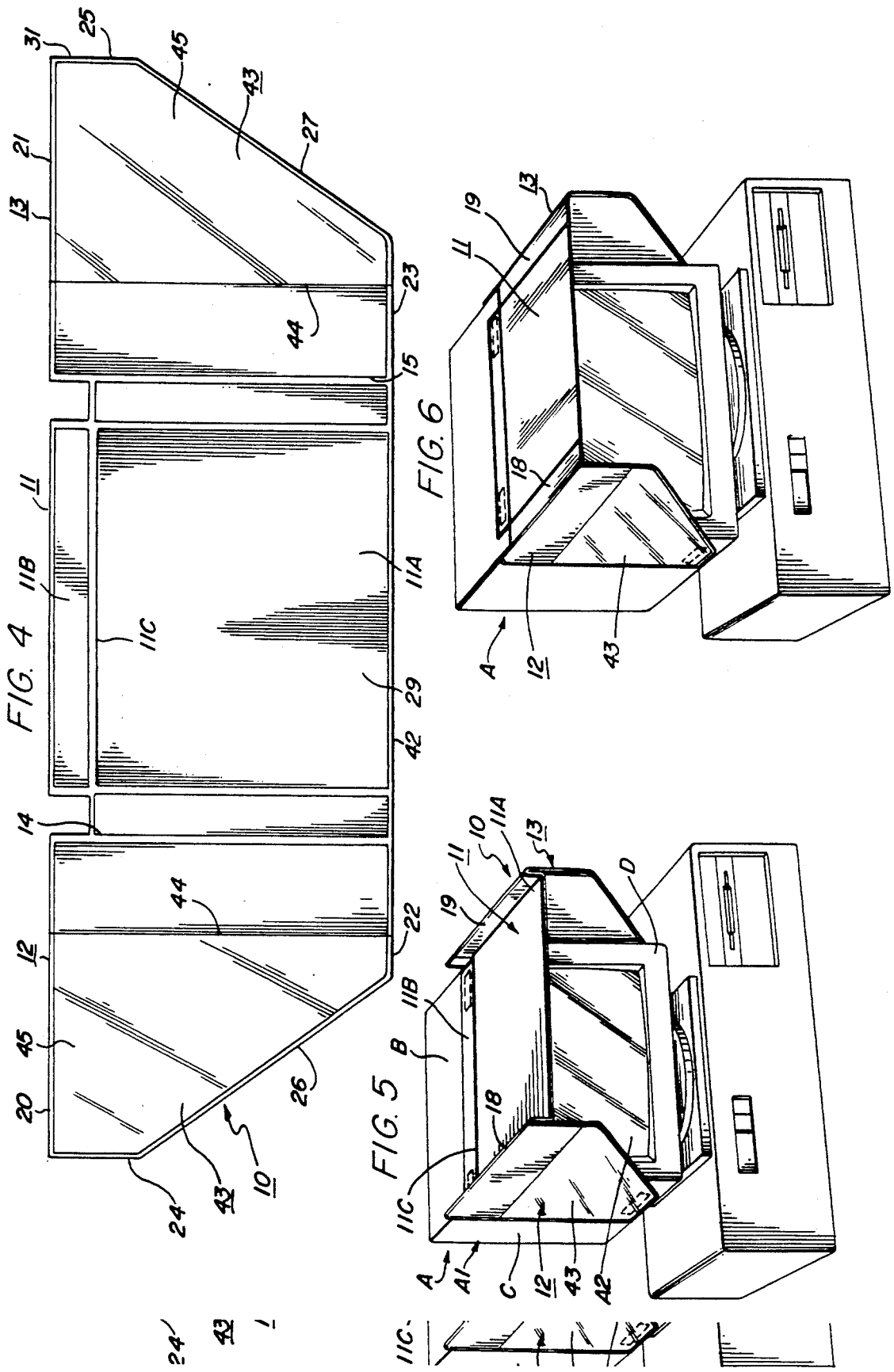

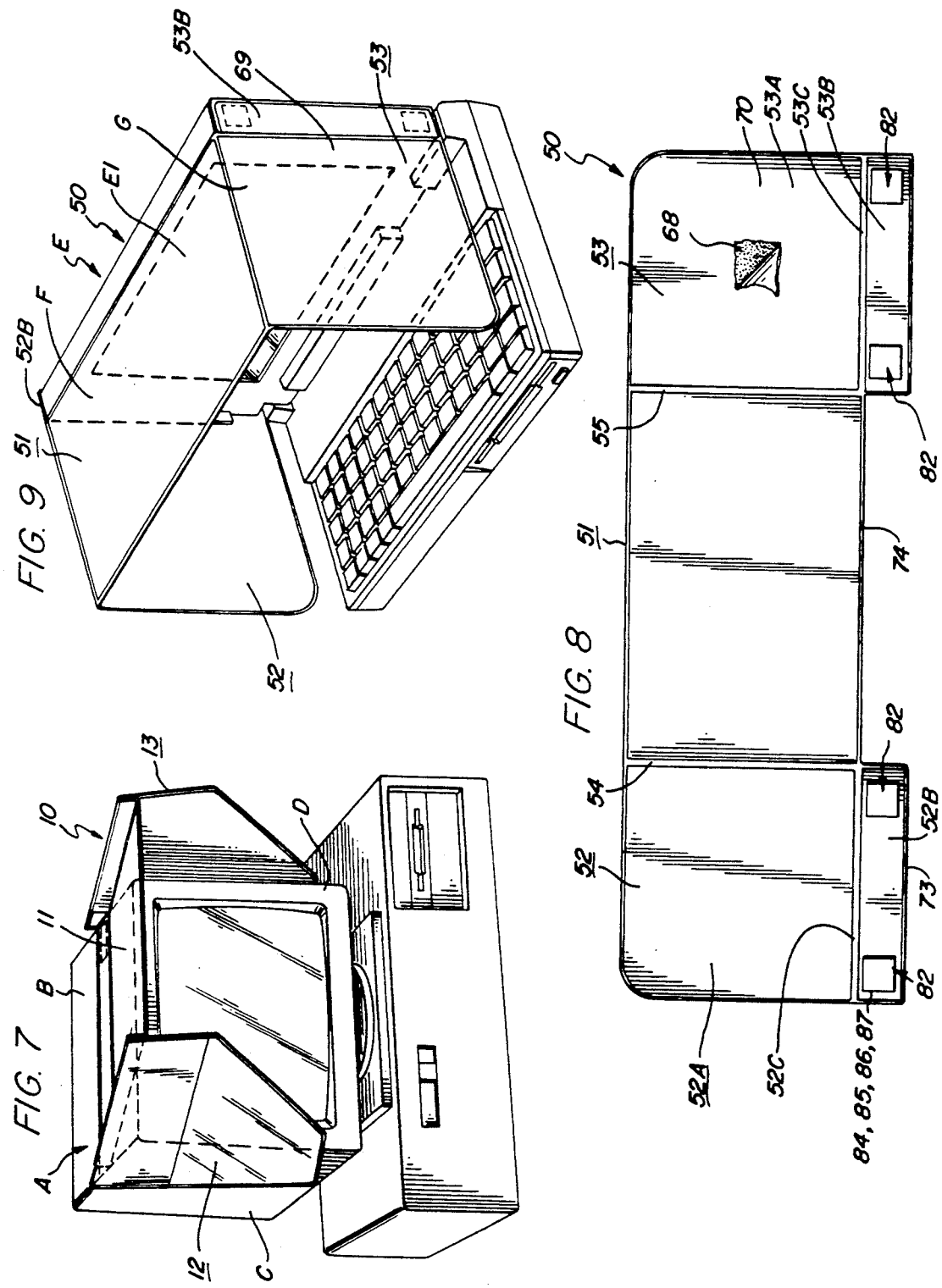

VIDEO DISPLAY TERMINAL VISOR

BACKGROUND OF THE INVENTION

A. Field of the Invention

This invention relates to accessories for use with visual display devices of the type used with video display terminals (VDT's), lap-top computers, television sets, and the like. More particularly, the invention relates to a visor for reducing the amount of ambient light impinging on the viewing screen of a VDT display device, or similar display device.

B. Description of Background Art

Video display terminals (VDT's) are used in great numbers to display electronically processed information. Displayed information can include alpha-numeric characters as well as graphical images. Display devices used in VDT's include cathode ray tubes (CRT's), liquid crystal panels and gas discharge devices.

Video display terminals, many of which employ CRT's, are being utilized by an increasing number of people. Large numbers of VDT's are used in business, security, military operations, scientific or academic work, computer-aided design, or pleasure games and hobbies, to name just a few applications employing VDT's.

A substantial percentage of VDT users are required to spend a large portion of their work day viewing information displayed on the CRT screen of a VDT. Not surprisingly, frequent users of VDT's have found that prolonged viewing of a CRT screen can cause eye strain, and physical and mental fatigue. In a report titled "Symptoms in Video Display Terminal Errors in the Presence of Small Refractive Errors" and published in September, 1988 in the Journal of the American Optometric Association, it was stated that 60 to 81% of those using a VDT for 6 hours or more per day reported experiencing significant eye strain and/or headaches. Aside from the fact that such negative effects of prolonged viewing of a VDT are unpleasant for those who must spend a substantial portion of their time at a computer terminal, resulting eye strain and fatigue can adversely affect job performance, by increasing the likelihood of operator errors or omissions.

A number of factors contribute to operator eye strain which can be caused by prolonged viewing of VDT's. For example, if the ambient light on the CRT face plate is too intense, the brightness of illuminated graphics displayed on the CRT phosphor screen relative to unilluminated areas, i.e., the contrast ratio, is reduced. With a reduced contrast ratio, the eye must strain to perceive the displayed image, causing discomfort if the operator is required to view such low-contrast ratio images over a prolonged period.

In addition to viewing difficulties caused by reduced contrast ratios resulting from certain conditions of ambient light that illuminates a CRT face plate, specular reflections of light off of the glass CRT face plate can sometimes glare directly into the eyes of the operator, further reducing visibility of images on the CRT screen, and further increasing the discomfort of the operator.

Another undesirable visual effect often encountered when viewing small characters or other images on a CRT screen is the appearance of a "halo" surrounding the illuminated picture elements (pixels). The halo can decrease the "sharpness" or resolution of the illuminated image. Also, halos can appear to overlie adjacent pixels, reducing their visibility.

From the description above, it is evident that a need exists for improving the viewability of images displayed on a CRT or other VDT display device to reduce eye strain, and increase display resolution, thereby increasing the comfort and efficiency of those who must use the VDT for prolonged periods. In response to this need, a variety of types of filters have been proposed for use with VDT's.

In U.S. Pat. No. 4,989,953, Feb. 5, 1991, Kirschner, Video Display Terminal Filter, the present inventor disclosed a novel and highly effective VDT filter, for improving the contrast and viewability of displays. That filter utilizes a thin transparent sheet of a soft polymeric material such as polyvinylchloride, which is adhered directly to the face plate of a VDT with the aid of a thin film of water applied to the face plate. Filters disclosed included those dyed with neutral gray for use with black and white or color CRT's (red, green, blue). A particularly novel development disclosed in the referenced patent is the inventor's discovery that filters of the type described which were dyed with a color subtractively complementary to the peak emission color of the display device provides a dramatic increase in contrast. Thus, a magenta-colored filter was found to be highly effective for use with CRT's employing a green phosphor screen. A bluish-colored filter proved highly effective for use with amber-colored displays.

When the face plate of a CRT or other VDT display device is illuminated with sufficiently high levels of ambient light, glare and contrast reduction can decrease viewability to an uncomfortable level, even if the VDT is provided with a highly effective colored filter of the type described above. In those situations where the sources of ambient light cannot be controlled directly, some sort of shield must be placed between a light source and a VDT, or the VDT must be re-positioned, to reduce the amount of light impinging on the VDT face plate to an acceptable level. The following U.S. patents disclose devices intended to reduce the level of ambient illumination of the face plate of a CRT or other display device.

Hursey, U.S. Pat. No. 3,961,159, Jun. 1, 1976, Light Shield/Support Device; Giulie, et al., U.S. Pat. No. 4,444,465, Apr. 24, 1984, CRT Shield; Kopich, U.S. Pat. No. 4,569,572, Feb. 11, 1986, Hood For Video Terminals: Giulie, U.S. Pat. No. 4,633,324, Dec. 30, 1986, CRT Shield: Tierney, U.S. Pat. No. 4,784,468, Nov. 15, 1988, Display Monitor Shield Assembly;

Gart, et al., U.S. Pat. No. 4,788,597, Removable Conforming Video Display Terminal Filter.

The present invention was conceived to provide an improved ambient light shielding device adapted for use with VDT's of a variety of shapes and sizes. A further goal of the present invention was to provide means to discourage unauthorized viewing of data on a VDT screen. With the proliferation of lap-top computers used in airplanes and other public places, it would be desirable to provide an accessory which hinders viewing of confidential or sensitive data displayed on a VDT screen, by an adjacent passenger or other member of the public.

OBJECTS OF THE INVENTION

An object of the present invention is to provide an ambient light shield for video display terminals (VDT's), television monitors and the like, the shield having the form of a visor arranged around the periphery of the viewing screen of the display device used in the VDT.

Another object of the invention is to provide a visor for video display terminals which hinders unauthorized viewing of data displayed on the VDT screen.

Another object of the invention is to provide a visor for VDT's, the basic design of the visor being adaptable for use both on free-standing video monitors, and on integral display devices of the type used in lap-top computers and other self-contained computing apparatus.

Another object of the invention is to provide a VDT visor which is readily attachable as an accessory to an existing VDT.

Another object of the invention is to provide a VDT visor which can be readily attached to and removed from an existing VDT, without requiring the drilling of holes or making other permanent alterations to the VDT.

Another object of the invention is to provide a VDT visor that, in a single model, is adaptable for use with VDT's of various sizes.

Another object of the invention is to provide a VDT visor that incorporates means for adjusting the elevation angle of a horizontal baffle which extends over the upper edge of a VDT face plate.

Another object of the invention is to provide a VDT visor which is readily foldable into a flat package, for ease of shipment and storage.

Another object of the invention is to provide a VDT visor which may be fabricated from lightweight, low cost materials, with a minimum number of required parts.

Another object of the invention is to provide a VDT visor having pockets for holding documents.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved ambient light and security shield for VDT's, the shield having the shape of a visor attachable around the periphery of a CRT face plate, or around the face plate of other types of display devices such as liquid crystal displays and gas discharge displays.

The basic embodiment of the VDT visor according to the present invention includes a plurality of thin, flat panel members that are hingedly joined to one another, and attachable to a VDT in a manner forming an inverted U-shaped structure surrounding the top, left and right sides of the VDT face plate. In the preferred embodiment, each of the flat members of the visor includes a thin, flat sheet of a relatively rigid material such as chipboard. Each sheet of chipboard has an edge that is parallel to, but spaced slightly apart from, an edge of an adjacent sheet. The chipboard sheets are encapsulated in pockets formed in a thin, flexible plastic material such as vinyl sheeting, the flexibility of the sheeting between adjacent chipboards allowing each member to pivot readily along the border line between adjacent members.

Preferably, the VDT visor according to the present invention has three panel members; left, upper and right, that may be unfolded from a flat configuration suited for shipment and storage, into an inverted U-shaped, visor-like structure conformable around the sides and top of a cabinet housing a VDT. The visor members intercept some of the ambient light which would otherwise impinge on the VDT face plate, thereby reducing glare, increasing contrast ratio, and improving viewability of information displayed on the VDT. Also, the visor members prevent casual observers from viewing information displayed on the VDT display screen, making the visor useful as a security shield.

Means are included in the VDT visor for removably fastening the flat members of the visor to the VDT cabinet. The preferred fastening means comprises complementary pairs of VELCRO-type hook and loop fastener strips, one pair member being fastened to an inner surface of each flat visor member, and a mating pair member adhesively attached to the outer surface of the cabinet.

BRIEF DESCRIPTION OF THE DRAWINGS

FIG. 1 is a partially fragmentary lower plan view of a Video Display Terminal (VDT) visor according to the present invention.

FIG. 2 is an enlarged sectional view of part of the article of FIG. 1, taken along line 2—2.

FIG. 3 is a lower plan view similar to that of FIG. 1, but showing the VDT visor folded for shipping and storage.

FIG. 4 is an upper plan view of the VDT visor of FIG. 1.

FIG. 5 is an upper perspective view of the VDT visor of FIG. 1, showing the visor attached to a VDT cabinet.

FIG. 6 is an upper perspective view similar to FIG. 5, but showing the VDT visor attached to a VDT cabinet of greater width than that shown in FIG. 4.

FIG. 7 is an upper perspective view similar to FIG. 6, but showing the visor tilted upwards for viewing the VDT screen from above its horizontal center line.

FIG. 8 is a lower plan view of another embodiment of a VDT visor according to the present invention.

FIG. 9 is an upper perspective view of an alternate embodiment of the VDT visor of FIG. 1, showing the visor attached to a computer having an integral display device.

DETAILED DESCRIPTION OF THE INVENTION

Referring now to FIGS. 1 through 9, a Video Display Terminal (VDT) visor according to the present invention is shown. FIGS. 1 through 7 illustrate an embodiment of a VDT visor according to the present invention, that is especially well adapted for use with stand-alone VDT's or monitors. FIGS. 8 and 9 illustrate an alternate embodiment of a VDT visor, according to the present invention, that is especially well adapted for use with lap-top computers and other electronic data processing apparatus of the type having an integral display device.

With reference first to FIGS. 1 through 7, a VDT visor 10 adapted for use with stand alone VDT's is shown. As may be seen best by referring to FIGS. 1 and 4, VDT visor 10 includes a plurality of thin, flat panels which are joined to one another to form a structure having a symmetrical plan-view shape. Thus, as shown in FIGS. 1 and 4, visor 10 has a laterally elongated, rectangular-shaped central panel 11. As may be seen best by referring to FIG. 4, panel 11 has a thin, laterally elongated rear rectangular-shaped flange strip portion 11B joined to a generally square-shaped main portion 11A along a joint line 11C.

Visor 10 also has left and right side wing panels 12 and 13, respectively, attached to the left and right sides of center panel 11. Left and right wing panels 12 and 13 have inner straight edges 14 and 15, respectively, which are hingedly joined to outer left and right vertical straight edges 16 and 17, respectively, of center panel 11. Preferably, vertically elongated, rectangular left and right expansion strips 18 and 19, respectively are interposed between the sides of center panel 11 and left and right wing panels 12 and 13, for reasons which will be described below.

As shown in FIG. 4, wing panels 12 and 13 each has a long straight rear edge wall, 20 and 21, respectively, and a shorter parallel front edge wall, 22 and 23, respectively, both rear and front edge walls being perpendicular to the inner straight edges 14 and 15 of the wing panels. Left and right wing panels 12 and 13 each has a short outer edge wall 24 and 25 respectively, which extends approximately perpendicularly forward from respective long rear edge walls 20 and 21. A fourth straight edge wall 26 extends obliquely upwards from outer edge wall 24 of left wing panel 12 to front edge wall 22. Similarly, right wing panel 13 has a fourth straight edge wall 27 which extends obliquely upwards from outer edge wall 25 to front edge wall 23.

The internal structure of visor 10 may be best understood by referring to FIGS. 1 and 2. As shown in FIGS. 1 and 2, each panel of visor 10 has a laminated structure that includes a thin flat, core sheet 28 made of a rigid material such as chipboard having a thickness of 0.01 inch and a density of 75 pt.-85 pt. Core sheet 28 of each panel is of the same shape but of a slightly smaller size than the exterior of the panel. Each core sheet 28 is encapsulated between upper and lower flexible sheets 29 and 30, respectively.

Sheets 29 and 30 are made of a thin, flexible plastic material, such as 14 gauge (0.015 inch thick) polyvinyl chloride. Each upper and lower vinyl sheet 29 and 30 has the same shape as a core sheet 28 which it encloses, but has a perimeter which extends a small distance, approximately 1/16 to 150 inch, beyond the perimeter of the core sheet. The extended portion of each vinyl upper sheet 29 is bonded to a corresponding extended portion of a lower vinyl sheet 30 to form a peripheral seam 31, thus encapsulating enclosed core sheet 28. Bonding of vinyl sheet 29 to sheet 30 to form seam 31 may be accomplished by any suitable means. Preferably, seam 31 is formed thermally, by application of ultrasonic or radio frequency electromagnetic energy, for example.

In those locations where peripheral seam 31 coincides with a joint line between adjacent panels of visor 10, the seam is somewhat wider than in those locations where the seam coincides with an outer perimeter of the visor. Thus, for example, that portion of seam 31 which coincides with joint line 11C between rear flange section 11B and main front section 11A of central panel 11 is about twice as wide as the portion of the seam which coincides with outer edge wall of a panel, such as oblique edge wall 26. In widened portions of seam 31 between adjacent panel sections, upper and lower laminating sheets 29 and 30 are bonded to one another to form a double thickness of vinyl sheeting which functions as a self-hinge between adjacent panel sections. Self-hinged joints formed by seam 31 between adjacent panel sections of visor 10 allow the panel sections to be folded together into a compact package which is ideally suited for shipping and storing the visor, as shown in FIG. 3. The self-hinged joints also allow visor 10 to be formed into a channel-shaped structure around the face plate of a VDT display device, as shown in FIG. 5 and as will be described in detail below.

As may be seen best by referring to FIG. 1, the lower flat surfaces of central panel 11 and left and right wing panels 12 and 13 of visor 10 are provided with fasteners for attaching the visor to a VDT cabinet.

Thus, as shown in FIGS. 1 and 2, a VELCRO-type hook fastener 32 is adhesively attached to that portion of lower laminating sheet 30 covering left wing panel 12, near the intersection of rear edge wall 20 and outer edge wall 24. Similarly, a fastener 32 is attached to that portion of lower laminating sheet 30 covering right wing panel 13, near the intersection of rear edge wall 21 and outer edge wall 25. Also, fasteners 32 are attached to that portion of lower laminating sheet 30 covering rear flange section 11B, near the rear edge wall 33 of the rear flange section.

Preferably, as shown in FIGS. 1 and 2, each VELCRO-type hook fastener 32 has initially adhered to its upper surface 34 a pile or loop type fastener 35. Also, each loop fastener 35 has on one surface thereof a layer of pressure-sensitive adhesive 36, covered by a smooth protective sheet 37 made of silicone treated paper or other smooth non-porous material that is capable of being readily peeled off of the adhesive layer.

As shown in FIGS. 1 and 2, VDT visor 10 is preferably provided with a longitudinally elongated, rectangular expansion strip 18 located between inner edge wall 14 of left wing panel 12, and left outer edge wall 16 of center panel 11. An identical expansion strip 19 is located between inner edge wall 15 of right wing panel 13, and right outer edge wall 17 of center panel 11. The rear edge wall 38 of left expansion strip 18 is parallel to and inward of rear edge wall 33 of rear flange section 11B, thereby forming a rectangular-shaped notch 39. Notch 39 extends forward from the rear aligned edges 20 and 33 of left wing panel 12 and center panel 11, respectively. Similarly, rear edge wall 40 of right expansion strip 19 is parallel to and inward of rear edge wall 33 of rear flange section 11B, and forms a rectangular-shaped notch 41.

Expansion strips 18 and 19 are formed in the same way as a self-hinged portion of seam 31, such as joint 11C between rear flange section 11B and central section 11A of center panel 11. Thus, expansion strips 18 and 19 are formed by thermally bonding upper vinyl sheet 29 to lower vinyl sheet 30 in elongated rectangular areas defining the limits of each of the expansion strips. In one embodiment of visor 10, expansion strips 18 and 19 are approximately 1½ inches wide. The reason for that choice of dimension will become apparent from the discussion below.

As shown in FIGS. 1 and 4, flexible vinyl sheets 29 and 30 that form left expansion strip 18 define a longitudinally disposed outer hinged joint line 14A slightly inward of inner edge wall 14 of left wing panel 12, and an inner longitudinally disposed hinge line 16A slightly outward of outer edge wall 16 of center panel 11. Similarly, a longitudinally disposed outer hinge line 15A is formed slightly inward of inner edge wall 15 of right wing panel 13, and an inner longitudinally disposed hinge line 17A is formed slightly outward of outer edge wall 17 of center panel 11.

To attach VDT visor 10 to the smallest-width VDT enclosure which the visor is intended to be used with, the center panel 11 is grasped near the front edge 42 of the center panel. Visor 10 is then lifted while holding center panel 11 approximately horizontally oriented. With visor 10 thus lifted, wing panels 12 and 13 bend downwards along hinge lines 16A and 17A, respectively, forming with center panel 11 an inverted U-shaped channel structure, which may be placed over a VDT enclosure A, as shown in FIG. 5. Rear center flange 11B of visor 10 is then positioned as desired in contact with the top panel B of VDT enclosure A. Also, left wing panel 12 is pushed into flush contact with the left side panel C of VDT enclosure A.

In the same manner, right wing panel 13 is pushed into flush contact with the right side panel D of VDT enclosure A. For a VDT enclosure A that has a width, measured between side panels C and D, less than the distance between fold lines 14 and 15 of visor 10, pushing the wing panels of the visor into flush contact with the enclosure side panels causes expansion strips 18 and 19 to bow upwards into vertically disposed positions, along the hinge lines on either side of each expansion strip.

With visor 10 positioned over VDT enclosure A as described above, the visor is tilted upwards to a desired elevation angle along hinge line 11 between central section 11A of center panel 11 and rear flange section 11B. Then, protective masking sheets 37 are peeled off of each fastener 35, and adhesive layer 36 of each fastener pressed firmly into the top or side panel of VDT enclosure A adjacent each fastener, as shown in FIG. 5. Now, VDT visor 10 can be removed from VDT enclosure A whenever desired, by peeling apart each VELCRO type hook fastener strip 32 from each mating pile or loop-type fastener strip 35. When it is desired to re-fasten VDT visor 10 to enclosure A, each hook fastener strip 32 on the visor is pressed into engagement with a corresponding loop-type fastener strip 35 on the enclosure. As shown in FIGS. 5 and 7, panels 11, 12 and 13 of visor 10 obstruct ambient light from impinging upon, and viewing of, screen A1 of VDT A from upper, left, and right sides of the enclosure.

As may be seen best by referring to FIGS. 4 and 5, either or both side panels 12 and 13 may be provided with a pocket 43 having a longitudinally disposed opening 44 for receiving documents. Preferably, pocket 43 is fabricated by bonding a translucent vinyl sheet 45 to upper laminating sheet 29 of visor 10.

If it is desired to re-position VDT visor 10 to a different elevation angle, as shown in FIG. 7, loop-type fastener strips 35 attached to side panels C and D are removed and re-positioned to achieve the desired inclination of the visor. Alternatively, hook-type fasteners 32 may be removed from left and right wing panels 12 and 13 and re-attached to different positions on the wing panels to achieve a desired change in inclination of VDT visor 10.

FIG. 6 illustrates the capability of VDT visor 10 to be attached to a wider VDT terminal than the one shown in FIG. 5. Thus, for example, FIG. 5 may be illustrative of VDT visor 10 being attached to a 12-inch monitor, while FIG. 6 shows the visor attached to a 15-inch monitor. Comparing FIG. 5 to FIG. 6, it may be seen that expansion strips 18 and 19 stretch out to horizontal positions from vertically disposed positions, when visor 10 is fitted over a wider VDT enclosure. For a 3-inch difference in width of the monitors as shown in FIGS. 5 and 6, it is evident that a suitable width for each expansion strip 18 and 19 is 1½ inches.

FIGS. 8 and 9 illustrate an alternate embodiment of a VDT visor according to the present invention, that is adapted to attach to a computer having an integral display, such as a lap-top computer.

As shown in FIG. 8, the construction of alternate embodiment 50 of a VDT visor is similar to the basic embodiment 10 described above. Thus, VDT visor 50 has a laterally elongated, rectangular center panel 51, a generally square-shaped left wing panel 52, and a right wing panel 53 having a shape identical to that of the left wing panel. Left wing panel 52 is hingedly joined to center panel 51 along self-hinge 54, while right wing panel 53 is hingedly joined to the center panel along self-hinge 55. Each panel section of VDT visor 50 has a separate thin, flat core sheet 68 encapsulated between an upper vinyl laminating sheet 69 and a lower vinyl laminating sheet 70.

Left wing panel 52 has a laterally elongated, rectangular flange section 52B that is joined to a main front section 52A of the panel along a straight, laterally disposed self-hinge line 52C. The rear edge wall 73 of flange section 52B is rearward of and parallel to rear edge wall 74 of center panel 51. Similarly, right wing panel 53 has a laterally elongated, rectangular flange section 53B that is joined to a main front section 53A of the panel along a hinge line 53C. A pair of laterally spaced-apart VELCRO-type hook fasteners 82 is fastened to the lower surface of flange section 52B. Also, a similarly disposed pair of VELCRO-type hook fasteners is fastened to the lower surface of flange section 53B. Preferably, each VELCRO-type hook fasteners 82 has initially adhered to its upper surface 84 a pile or loop-type fastener 85. Also, each loop fastener 85 has on one surface thereof a layer of pressure-sensitive adhesive 86, covered by a smooth protective sheet 87 made of silicone treated paper or other smooth, non-porous material that is capable of being readily peeled off of the adhesive layer.

FIG. 9 shows VDT visor 50 attached to a lap-top computer E. As shown in FIG. 9, visor 50 is formed into an inverted U-shape. Visor 50 is than placed into contact with left and right side bezel members F and G, respectively. After the fit of visor 50 to computer E has been confirmed as described above, the visor is removed from the computer, and protective sheet 87 peeled off pressure-sensitive adhesive layer 86 of each loop fastener 85. Flange sections 52B and 53B of visor 50 are then pressed firmly against left and right bezel members F and G, respectively, as shown in FIG. 9, adhering loop fasteners 85 to the bezel members. This operation secures fasteners 85 to computer E, and secures visor 50 into a shielding position around the top and sides of the display.

For use on computers of greater width, flange sections 52B and 53B of visor 50 may be bent outwards, perpendicular to left and right wing members 52 and 53, and adhered to front bezel surfaces parallel to display surface E1 of computer E. When it is desired to fold up computer E into a closed configuration to facilitate storing or transporting the computer, hook fasteners 82 of visor 50 are disengaged from mating loop fasteners 85 attached to the computer. Then, visor 50 may be folded flat into a compact package, similar to that shown in FIG. 3.

I claim:

1. An article for decreasing the amount of ambient light incident upon the screen of a video display device comprising:
    a. a plurality of generally flat, generally rigid panel members each comprising a thin, flat core sheet made of a rigid material, and a flexible cover sheet covering said core sheet,
    b. hinge means joining adjacent members of said plurality of panel members, said hinge means permitting said panel members to be folded parallel to one another for storage and shipment, and into a channel-shaped structure conformable around at least part of the periphery of the display screen of said video display device, and
    c. means for removably fastening said panel members to said display device.

2. The article of claim 1 wherein said hinge means is further defined as comprising in combination an elongated strip of flexible material joining a pair of adjacent panel members.

3. The article of claim 2 wherein said strip of flexible material is further defined as being coextensive with said flexible cover sheet.

4. The article of claim 3 wherein said plurality of panel members is further defined as comprising three panel members.

5. The article of claim 4 wherein said plurality of three panel members is further defined as a center panel member adapted to be positioned in a horizontally cantilevered position over the screen of a video display terminal, and two side wing panel members, one each hingedly fastened to an opposite lateral edge of said center panel member.

6. The article of claim 5 wherein said strip of flexible material comprising said hinge means is further defined as being laterally elongated, said center panel member being of the proper width to span the width of the smallest size display which said article is intended to be used with, and the combined width of said center panel member and said laterally elongated hinge means being of the proper width to span the width of the largest size display which said article is intended to be used with.

7. A visor for decreasing the amount of ambient light incident upon the screen of a video display device comprising:
    a. a generally rectangular-shaped center panel member, said center panel member having a thin, flat stiff core member encapsulated between upper and lower flexible cover sheets,
    b. a first, left side wing panel member, said left side wing panel member having a thin, flat stiff core member encapsulated between upper and lower flexible cover sheets coextensive with said respective upper and lower flexible cover sheets of said center panel member, said stiff core member of said left side wing panel member having an inner lateral edge wall parallel to and spaced laterally outwards of an outer lateral edge wall of said stiff core member of said center panel member, said flexible upper and lower cover sheets spanning the space between adjacent edge walls of said stiff core members forming first hinge means, between said center panel member and said left side wing panel member,
    c. a second, right side wing panel member identical to said left side wing panel member, said right side wing panel member being joined to the right lateral side of said center panel member by second hinge means identical to said first hinge means, and
    d. means for removably fastening said visor to the housing of said video display device.

8. The visor of claim 7 wherein said center panel member is further defined as having a laterally elongated, generally rectangular-shaped rear flange section, said rear flange section hingedly joined on a front edge thereof to a larger, main portion of said center panel member, notches being formed inward from the rear edge of said center panel member and said side panel members to permit hingeable movement of said flange section relative to said main portion of said center panel member.

9. The visor of claim 7 wherein said hinge means joining said center panel member to said side wing panel member are laterally elongated, thereby adapting said visor to span video display devices of various widths.

10. The visor of claim 7 wherein said flexible upper and lower cover sheets are bonded to one another, thereby encapsulating said stiff core members in pockets formed between said cover sheets.

11. The visor of claim 10 wherein said cover sheets are further defined as being made of a thin, flexible plastic material.

12. The visor of claim 11 wherein said flexible plastic material is further defined as being a vinyl material.

13. The visor of claim 12 wherein said means for removably fastening said visor to said housing of said video display device is further defined as a plurality of complementary pairs of hook and loop fasteners, one member of each complementary pair being attached to said lower cover sheet, the second member of said complementary pair having means for attaching said member to said housing of said video display device.

14. The visor of claim 12 wherein said side wing panel members are further defined as having an obliquely disposed outer edge wall.

15. The visor of claim 11 wherein said means for removably fastening said visor to said housing of said video display device is further defined as a plurality of complementary pairs of hook and loop fasteners, one member of each complementary pair being attached to said lower cover sheet, the second member of said complementary pair having means for attaching said member to said housing of said video display device.

16. The visor of claim 7 further including a document storage pocket, said pocket comprising a sheet of flexible material adhered on all but one edge thereof to said upper cover sheet of at least one of said panel members.

17. A visor for decreasing the amount of ambient light incident upon the screen of a video display device comprising:
    a. a generally rectangular-shaped center panel member, said center panel member having a thin, flat stiff core member encapsulated between upper and lower flexible cover sheets, b. a first, left edge of said center panel member having a generally rectangular shape, said left side wing panel member being attached to a first, left, edge of said center panel member, the front longitudinal edge wall of said wing panel being colinear with the front longitudinal edge wall of said center panel member, said left side wing panel member having a thin, flat stiff core member encapsulated between flexible upper and lower cover sheets coextensive with said respective upper and lower cover sheets of said center panel member, said flexible cover sheets forming a self-hinge permitting pivotal motion between said center panel member and said left side wing panel member to form various dihedral angles between said panel members, c. a second, right side wing panel member identical to said left side wing panel member attached to a second, right, edge of said center panel member, and d. means for removably fastening said visor to the housing, of said video display device.

18. The visor of claim 17 wherein said left side wing panel member and said right side wing panel member are both further defined as having a laterally elongated generally rectangular-shaped rear flange section, said rear flange section being hingedly joined on a front edge thereof to a larger, generally square-shaped main portion of a respective side wing panel member, said flange section having a rear longitudinal edge wall located rearward of the rear longitudinal edge wall" of said center panel member.

19. The visor of claim 18 wherein said means for removably fastening said visor to said housing of said video display device is further defined as a plurality of complementary pairs of hook and loop fasteners, one member of each complementary pair being attached to said lower cover sheet of said flange section of said left side and right side wing panel members, the second member of said complementary pair having means for attaching said member to said housing of said video display device.

* * * * *